Patented Apr. 21, 1931

1,802,174

UNITED STATES PATENT OFFICE

FRITZ GUENTHER, FRITZ TELLER, CARL IMMERHEISER, AND BODO ZSCHIMMER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

EMULSIFYING AGENT

No Drawing. Original application filed September 13, 1926, Serial No. 135,294, and in Germany April 28, 1926. Divided and this application filed October 24, 1928. Serial No. 314,840.

The present application has been divided out from the application Ser. No. 135,294, filed September 13, 1926.

Emulsions of liquid or solid materials difficultly soluble or insoluble in water or not miscible therewith are usually prepared with the aid of soap or substances possessing similar properties, such as Turkey red oil, organic sulfonic acids and the like; solid materials are emulsified in the form of a melt or of a solution in a suitable solvent. In many cases, however, a satisfactory result is not obtained by this method. For example it is not possible to form a stable emulsion of olive oil in water with the aid of soap or sulfonic acids of soap-like character.

We have now found that oils, fats, waxes, hydrocarbons, alcohols, ketones, esters, and other materials insoluble or difficultly soluble in water or not miscible therewith, whether solid or liquid, can be converted into emulsions which are very stable even when diluted with water and in many cases even in the presence of acids by employing a soap or a substance having soap-like properties in conjunction with a protective colloid such as glue, gelatine, casein, agar-agar, dimethylcellulose and the like, or with water-soluble gums such as gum arabic or similar materials.

As examples of substances having soap-like properties applicable according to the present invention we mention grain or soft or other soaps, Turkey red oil, saponines, salts of cholic acid, sulfite cellulose waste liquor, tri-oxyethylamine, alkylated aromatic sulfonic acids, especially those of the naphthalene series and the like.

Instead of adding the said ingredients of the two groups successively in the course of the emulsifying process, the said soap-like and the protective colloids may also be mixed beforehand; thereby readily storable and marketable emulsifying preparations are obtained which are at once ready for use.

We have further found that such mixtures can be advantageously employed for the preparation of mineral or artificial materials such as inorganic or organic colors, soot, sulfur, blanc fixe and the like, in a finely subdivided state, for which purpose the said mixtures are added to the liquid in which the said materials are prepared or by adding them in the course of the milling process. By this means the materials are obtained in a state of such a fine dispersion as cannot be produced by the methods hitherto in use; by reason of the fine subdivision for example coloring matters and pigment colors possess a very great coloring and covering power.

The following examples will further illustrate how our invention may be carried out in practice, but the invention is not limited to these examples. The parts are by weight, unless otherwise stated.

Example 1

40 parts of a 70 per cent paste of isopropylnaphthalene sulfonic acid sodium salt are stirred with 200 parts of water and mixed with a warm solution of 80 parts of bone glue in about 180 parts of water. This mixture is capable of emulsifying about 1600 parts of olive oil. It may be employed directly for making emulsions or it may be concentrated on a hot water bath while stirring or it may be evaporated to dryness in vacuo and finely powdered.

By introducing, while stirring, 16 parts of olive oil into one part of the powdered emulsifying agent mentioned above dissolved in 4 parts of water, a salve-like mass is obtained after some time which by stirring with water is converted into a thin liquid of milk-like appearance.

The emulsifying agent can also be prepared by initimately mixing 95 parts of finely powdered glue with 35 parts of isopropylnaphthalene sulfonic acid sodium salt in the solid state. 1 part of this mixture dissolved in 4 parts of water is capable of emulsifying 15 or more parts of olive oil.

Instead of the isopropyl-naphthalene sulfonic acid sodium salt, other substances of soap properties, for example 40 parts of grain soap may be employed.

Example 2

10 parts of neutralized concentrated sulfite cellulose waste liquor in the form of a 20 per cent solution are stirred with about 4 parts of bone glue dissolved in about 9 parts of water. This mixture is suitable for example for emulsifying about 25 parts of olive oil.

*Example 3*

10 parts of a 70 per cent paste of isopropyl-naphthalene sulfonic acid sodium salt are stirred with 100 parts of water and mixed with a solution of 80 parts of bone glue in 45 parts of water. By adding 20 parts of molten paraffin wax a white tough mass is obtained which forms stable emulsions with water.

In the foregoing examples Turkey red oil, saponines and salts of sulfonic acids other than isopropyl-naphthalene sulfonic acid sodim salt may be employed as substances having soap-like properties. The glue may be replaced for example by gelatin or by gum arabic.

Instead of olive oil, other oils such as castor oil, linseed oil, mineral oils, oleic acid and the like can be emulsified.

*Example 4*

300 parts, by volume, of a 20 per cent solution of glue are mixed with a solution of 30 parts of isopropyl-naphthalene sulfonic acid sodium salt in 150 parts, by volume, of water.

450 parts, by volume, of a mineral oil are added to this mixture while vigorously stirring. A salve-like mass is obtained which when mixed with dyestuffs, color lakes, pigments, soot or the like and diluted with water to a suitable consistency, forms a non-setting printing ink very suitable for graphic purposes, for instance for intaglio.

The above proportions may be varied within wide limits; instead of mineral oil, other oils in use in graphic industries, varnishes and the like may be employed. The isopropyl-naphthalene sulfonic acid sodium salt may be replaced by about the same quantity of the sodium salt of butyl-naphthalene sulfonic acid, N-diamyl-naphthylamine sulfonic acid or dibutyl-sulfanilic acid.

*Example 5*

20 parts of the sodium salt of a resin sulfonic acid obtainable by sulfonating rosin, are dissolved in 40 parts of water and mixed with a solution of 40 parts of glue in 120 parts of water. The mixture is concentrated on a water bath at a low temperature, evaporated to dryness in vacuo and powdered.

1 part of this emulsifying agent dissolved in 3 parts of water is capable of emulsifying 15 parts of olive oil.

*Example 6*

100 parts of the yellow pigment color obtained from diazotized 5-nitro-4-toluidine and aceto-acetic-anilide are intimately ground in the dry state with 15 parts of powdered glue and 3 parts of benzyl-aniline sulfonic acid sodium salt. The resulting coloring matter is very finely divided in comparison with the initial material. It forms highly dispersed suspensions when made into a paste with water, which suspensions may be employed with advantage for example for coloring paper pulp, for the production of paste colors for wall papers and the like.

In a similar manner, other substances for example casein, or gum arabic may be employed instead of glue. The benzyl-aniline sulfonic acid sodium salt may be replaced by saponines, cholic acid salts, sulfite cellulose waste liquor, salts of alkylated naphthalene sulfonic acids and the like. The quantities of the ingredients employed may be varied within wide limits.

Instead of starting from the powdery dyestuff, it is also possible to employ an aqueous paste of the coloring matters, to mix same with the dispersing agents or their solutions, whereupon the mass is dried and ground. Grinding may be dispensed with, if the drying is effected so as to obtain directly a dry powdery product.

*Example 7*

15 parts of beta-naphthol are dissolved in 500 parts of water by adding 13 parts of caustic soda lye of 40 degrees Baumé and 10 parts of soda ash. A mixture of 3 parts of glue and 1 part of tri-oxyethyl-amine, dissolved in 40 parts of water, is added to the solution, whereupon a solution of the diazo compound of 13.8 parts of para-nitroaniline is caused to run into the mixture. The coloring matter separates out in a so finely divided state as cannot be obtained by the employment of glue or tri-oxyethyl-amine alone. Instead of the tri-oxyethyl-amine for example saponines, Turkey red oil or naphthalene sulfonic acid sodium salts substituted in the nucleus by isopropyl or butyl groups may be employed; the glue may be replaced by starch, water-soluble gums and the like.

The processes described in the above Examples 6 and 7 may also be carried out in the presence of substrates such as are usual in the industry of color lakes.

*Example 8*

300 parts of water are mixed with an aqueous solution of 2.5 parts of cellulose dimethyl ether and 2.5 parts of isopropyl-naphthalene sulfonic acid sodium salt. 80 parts of olein are then caused to run in while continuously stirring. A homogeneous emulsion is obtained which may be employed for example for oiling wool.

What we claim is:

1. The process of dispersing materials which comprises treating the material with a hydroxy alkyl-amine in conjunction with a protective colloid.

2. The process of producing finely divided solid materials characterized by dispersing the material in the presence of tri-hydroxyethyl-amine in conjunction with a protective colloid.

3. The process of producing finely divided solid materials characterized by mixing a suspension of a solid material with tri-hydroxyethyl-amine and a protective colloid.

4. The process of producing finely divided solid materials characterized by mixing a suspension of a dyestuff with tri-hydroxyethyl-amine and a protective colloid.

5. A composition of matter comprising tri-hydroxyethyl-amine and a protective colloid.

6. A composition of matter comprising a coloring matter, tri-hydroxyethyl-amine and a protective colloid.

7. A composition of matter comprising an organic dyestuff, tri-hydroxyethyl-amine and a protective colloid.

8. A composition of matter comprising a lake of an organic dyestuff, tri-hydroxyethyl-amine and a protective colloid.

In testimony whereof, we affix our signatures.

FRITZ GUENTHER.
FRITZ TELLER.
CARL IMMERHEISER.
BODO ZSCHIMMER.